(12) United States Patent
Simpson et al.

(10) Patent No.: US 8,840,371 B2
(45) Date of Patent: Sep. 23, 2014

(54) METHODS AND SYSTEMS FOR USE IN REGULATING A TEMPERATURE OF COMPONENTS

(75) Inventors: Stanley Frank Simpson, Simpsonville, SC (US); Dipankar Pal, Greenville, SC (US); Jeffrey Todd Knapp, Golden, CO (US)

(73) Assignee: General Electric Company, Schenectady, NY (US)

( * ) Notice: Subject to any disclaimer, the term of this patent is extended or adjusted under 35 U.S.C. 154(b) by 473 days.

(21) Appl. No.: 13/268,254

(22) Filed: Oct. 7, 2011

(65) Prior Publication Data

US 2013/0089434 A1   Apr. 11, 2013

(51) Int. Cl.
 *F01D 5/18* (2006.01)
(52) U.S. Cl.
 CPC .............. *F01D 5/187* (2013.01); *Y02T 50/676* (2013.01); *F05D 2260/22141* (2013.01); *F05D 2260/2212* (2013.01); *F05D 2260/2214* (2013.01); *Y02T 50/673* (2013.01)
 USPC ...................................................... 416/97 R
(58) Field of Classification Search
 USPC ....... 415/115, 116; 416/96 R, 97 R; 165/168, 165/170
 See application file for complete search history.

(56) References Cited

U.S. PATENT DOCUMENTS

| 3,741,285 | A | | 6/1973 | Kuethe |
| 4,446,693 | A | | 5/1984 | Pidcock et al. |
| 4,765,397 | A | * | 8/1988 | Chrysler et al. ......... 165/104.33 |
| 5,353,865 | A | | 10/1994 | Adiutori et al. |
| 5,738,493 | A | * | 4/1998 | Lee et al. ..................... 416/97 R |
| 6,402,470 | B1 | * | 6/2002 | Kvasnak et al. ............ 416/97 R |
| 6,408,628 | B1 | | 6/2002 | Pidcock et al. |
| 6,890,154 | B2 | * | 5/2005 | Cunha .......................... 416/97 R |
| 6,984,102 | B2 | * | 1/2006 | Bunker et al. ................. 415/115 |
| 7,007,482 | B2 | | 3/2006 | Green et al. |
| 7,553,128 | B2 | | 6/2009 | Abdel-Messeh et al. |
| 7,681,398 | B2 | | 3/2010 | Patel et al. |
| 7,785,070 | B2 | * | 8/2010 | Liang .......................... 416/97 R |
| 7,886,541 | B2 | | 2/2011 | Woolford et al. |
| 2002/0066273 | A1 | | 6/2002 | Kitamura et al. |
| 2003/0108422 | A1 | * | 6/2003 | Merry ......................... 416/97 R |

(Continued)

FOREIGN PATENT DOCUMENTS

| EP | 1091091 A2 | 4/2001 |
| EP | 1319803 A2 | 6/2003 |

(Continued)

OTHER PUBLICATIONS

Search Report from corresponding EP Application No. 12187540.5 dated Apr. 4, 2014.

*Primary Examiner* — Liam McDowell
(74) *Attorney, Agent, or Firm* — Armstrong Teasdale LLP (57) ABSTRACT

A cooling system for use in regulating a temperature of a component is described herein. The cooling system includes a plurality of flow control assemblies that are defined across a sidewall of the component for channeling a cooling fluid across a surface of the sidewall. The plurality of flow control assemblies are configured to adjust a plurality of fluid flow characteristics of the cooling fluid. The plurality of flow control assemblies includes a first flow control assembly configured to adjust a first fluid flow characteristic, and at least a second flow control assembly configured to adjust a second fluid flow characteristic that is different than the first fluid flow characteristic.

20 Claims, 6 Drawing Sheets

(56) References Cited

U.S. PATENT DOCUMENTS

2006/0171808 A1 8/2006 Liang
2006/0222493 A1 10/2006 Liang
2012/0020787 A1* 1/2012 Kruckels et al. .......... 416/1
2013/0236330 A1 9/2013 Lee

FOREIGN PATENT DOCUMENTS

| EP | 1985804 A1 | 10/2008 |
| EP | 2143883 A1 | 1/2010 |
| EP | 2489838 A2 | 8/2012 |
| WO | 2013142460 A1 | 9/2013 |

* cited by examiner

METHODS AND SYSTEMS FOR USE IN REGULATING A TEMPERATURE OF COMPONENTS

BACKGROUND OF THE INVENTION

The field of the disclosure relates generally to cooling systems, and more particularly, to a cooling system for use in regulating a temperature of components of a machine.

At least some known gas turbine engines include a combustor, a compressor coupled upstream from the combustor, a turbine, and a rotor assembly rotatably coupled between the compressor and the turbine. Some known rotor assemblies include a rotor shaft, at least one rotor disk coupled to the rotor shaft, and a plurality of circumferentially-spaced turbine blades or buckets that extend outward from each rotor disk.

During operation of at least some of such turbines, the compressor compresses air that is subsequently mixed with fuel prior to being channeled to the combustor. The mixture is then ignited generating hot combustion gases that are then channeled to the turbine. The rotating turbine blades or buckets channel high-temperature fluids, such as combustion gases, through the turbine. The turbine extracts energy from the combustion gases for powering the compressor, as well as producing useful work to power a load, such as an electrical generator, or to propel an aircraft in flight.

At least some known turbine blades include an airfoil that includes a pressure side and a suction side that are connected together along leading and trailing edges. Each airfoil extends radially outwardly from a dovetail that is used to mount the turbine blade to a rotor disk or spool. During operation, the leading edge portions of at least some known turbine blades are generally exposed to higher temperatures than the trailing edge portions. At least some known blades are hollow and include an internal cooling cavity that is defined at least partially by the airfoil and dovetail. Cooling fluid is channeled within the cavity in a random flow pattern that may create temperature variations throughout the turbine blade and that may create an uneven heat transfer between the turbine blade and the cooling fluid. Such temperature variations may induce compressive thermal stresses to the airfoil. Over time, continued operation with high compressive thermal stresses may lead to airfoil cracking, and/or airfoil deflection, any or all of which may shorten the useful life of the rotor assembly.

BRIEF DESCRIPTION OF THE INVENTION

In one aspect, a cooling system for use in regulating a temperature of a component is provided. The cooling system includes a plurality of flow control assemblies that are defined across a sidewall of the component for channeling a cooling fluid across a surface of the sidewall. The plurality of flow control assemblies are configured to adjust a plurality of fluid flow characteristics of the cooling fluid. The plurality of flow control assemblies includes a first flow control assembly configured to adjust a first fluid flow characteristic, and at least a second flow control assembly configured to adjust a second fluid flow characteristic that is different than the first fluid flow characteristic.

In another aspect, an airfoil for use in a turbine engine is provided. The airfoil includes a sidewall that includes an inner surface that defines a cavity therein, and a cooling system defined across the inner surface for channeling a cooling fluid across the inner surface to facilitate regulating a temperature of the airfoil. The cooling system includes a plurality of flow control assemblies that are configured to adjust a plurality of fluid flow characteristics of the cooling fluid. The plurality of flow control assemblies includes a first flow control assembly configured to adjust a first fluid flow characteristic, and at least a second flow control assembly configured to adjust a second fluid flow characteristic that is different than the first fluid flow characteristic.

In a further aspect, a method of assembling an airfoil for use in a turbine engine is provided. The method includes providing a first flow control assembly on a first sidewall of the airfoil, wherein the first flow control assembly is configured to adjust a first flow characteristic of a cooling fluid channeled across the first sidewall to facilitate regulating a temperature of the airfoil. A second flow control assembly is provided on the first sidewall, wherein the second flow control assembly is configured to adjust a second flow characteristic of cooling fluid that is different than the first fluid flow characteristic. A second sidewall is coupled to the first sidewall to form the airfoil extending between a leading edge and a trailing edge, and having a cavity that is at least partially defined by the first sidewall inner surface.

DETAILED DESCRIPTION OF THE INVENTION

The exemplary methods and systems described herein overcome at least some disadvantages of known component cooling systems by providing a cooling system that channels a cooling fluid across a surface of a component to facilitate regulating a temperature of the component. More specifically, the embodiments described herein provide a cooling system that includes a plurality of flow control assemblies that are configured to adjust a plurality of fluid flow characteristics of a cooling fluid channeled across a surface of the component. Moreover, the cooling system increases component cooling and generates an aerodynamic exit fluid flow across the component. In addition, the cooling system includes a heat transfer assembly that induces a turbulence within a cooling fluid being channeled across a surface of the component to facilitate increasing cooling of the component. In addition, the cooling system includes a flow control assembly that adjusts a flow velocity and/or a direction of cooling fluid channeled from the heat transfer assembly to generate an aerodynamic fluid flow and/or a hydrodynamic fluid flow across the component. By providing a heat transfer assembly and a flow control assembly, the cooling system channels cooling fluid to sections of the component that require increased cooling to reduce undesired temperature variations within the component thus increasing the operating life of the component. As such, the cost of maintaining the component should concurrently be reduced.

The following detailed description illustrates the disclosure by way of example and not by way of limitation. The description enables one skilled in the art to make and use the disclosure, describes several embodiments, adaptations, variations, alternatives, and uses of the disclosure, including what is presently believed to be the best mode of carrying out the disclosure. The disclosure is described as applied to a preferred embodiment, namely, channeling a flow of cooling fluid across a component of a turbine engine. However, it is contemplated that this disclosure has general application to cooling mechanical and/or electrical machine components. Moreover, the cooling system described herein may be used in any high-fluid flow environments in which efficient heat exchange and aerodynamic exit flow is desired. As used herein, the term "high-fluid flow environment" refers to an environment in which the rate of cooling fluid flow is large enough such that turbulence and/or flow stability is a consideration of cooling system design. Thus, the embodiment described herein may be implemented with many other component cooling system applications.

Figure 1:
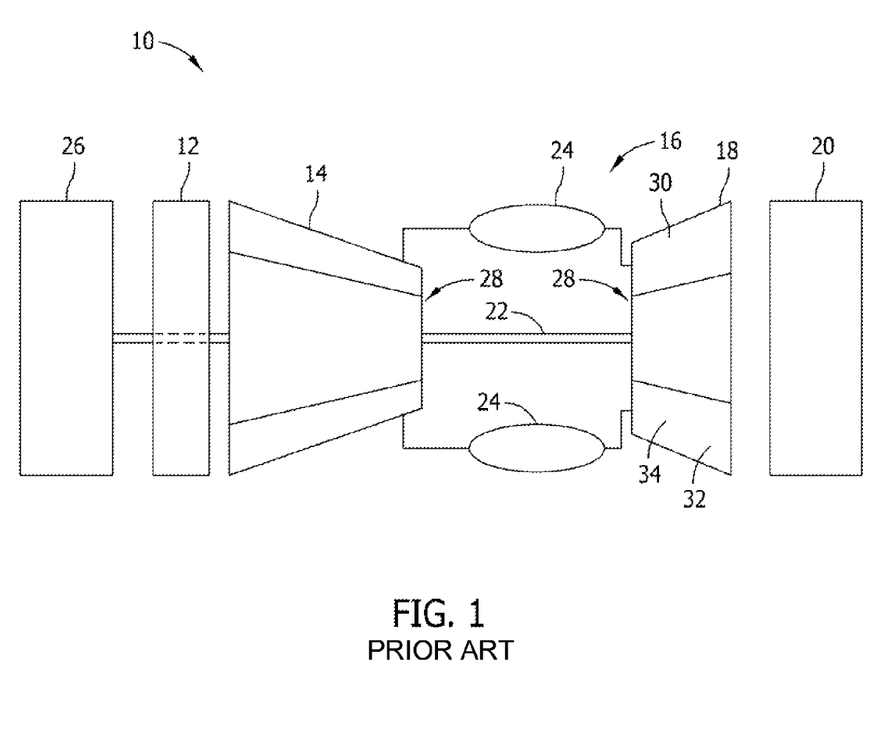
FIG. 1 is a schematic view of an exemplary turbine engine.

FIG. 1 is a schematic view of an exemplary turbine engine system 10. In the exemplary embodiment, turbine engine system 10 includes an intake section 12, a compressor section 14 downstream from intake section 12, a combustor section 16 downstream from compressor section 14, a turbine section 18 downstream from combustor section 16, and an exhaust section 20 that is coupled to turbine section 18. Turbine section 18 is coupled to compressor section 14 via a rotor shaft 22. In the exemplary embodiment, combustor section 16 includes a plurality of combustors 24. Combustor section 16 is coupled to compressor section 14 such that each combustor 24 is in flow communication with compressor section 14. Turbine section 18 is coupled to compressor section 14 and to a load 26 such as, but not limited to, an electrical generator and/or a mechanical drive application. In the exemplary embodiment, each compressor section 14 and turbine section 18 includes at least one rotor assembly 28 that is coupled to rotor shaft 22. Rotor assembly 28 includes a plurality of turbine bucket assemblies 30 (shown in FIG. 2) that extend outwardly from rotor shaft 22, and a plurality of stator vane assemblies 32 (shown in FIG. 2) that are positioned between adjacent turbine bucket assemblies 30.

During operation, intake section 12 channels air towards compressor section 14 wherein the air is compressed to a higher pressure and temperature prior to being discharged towards combustor section 16. Combustor section 16 mixes the compressed air with fuel, ignites the fuel-air mixture to generate combustion gases, and channels the combustion gases towards turbine section 18. More specifically, within each combustor 24, fuel, for example, natural gas and/or fuel oil, is injected into the air flow, and the fuel-air mixture is ignited to generate high temperature combustion gases that are channeled towards turbine section 18. Turbine section 18 converts thermal energy from the gas stream to mechanical rotational energy as the combustion gases impart rotational energy to turbine section 18 and to rotor assembly 28. As combustion gases are channeled across a component 34 such as, for example, turbine bucket assemblies 30 and/or stator vane assemblies 32, a temperature of component 34 is increased. During operation, combustion gases may cause a thermal gradient to form within component 34 including the creation of an undesirable variable thermal expansion across a component surface (not shown) that may cause damage such as thermal cracking and/or thermal warping of component 34. To reduce the occurrence of damage caused by undesirable thermal expansion, a cooling fluid is channeled within component 34 to cool component 34 and to facilitate regulating a temperature of component 34 and/or reduce the operational thermal gradient.

Figure 2:
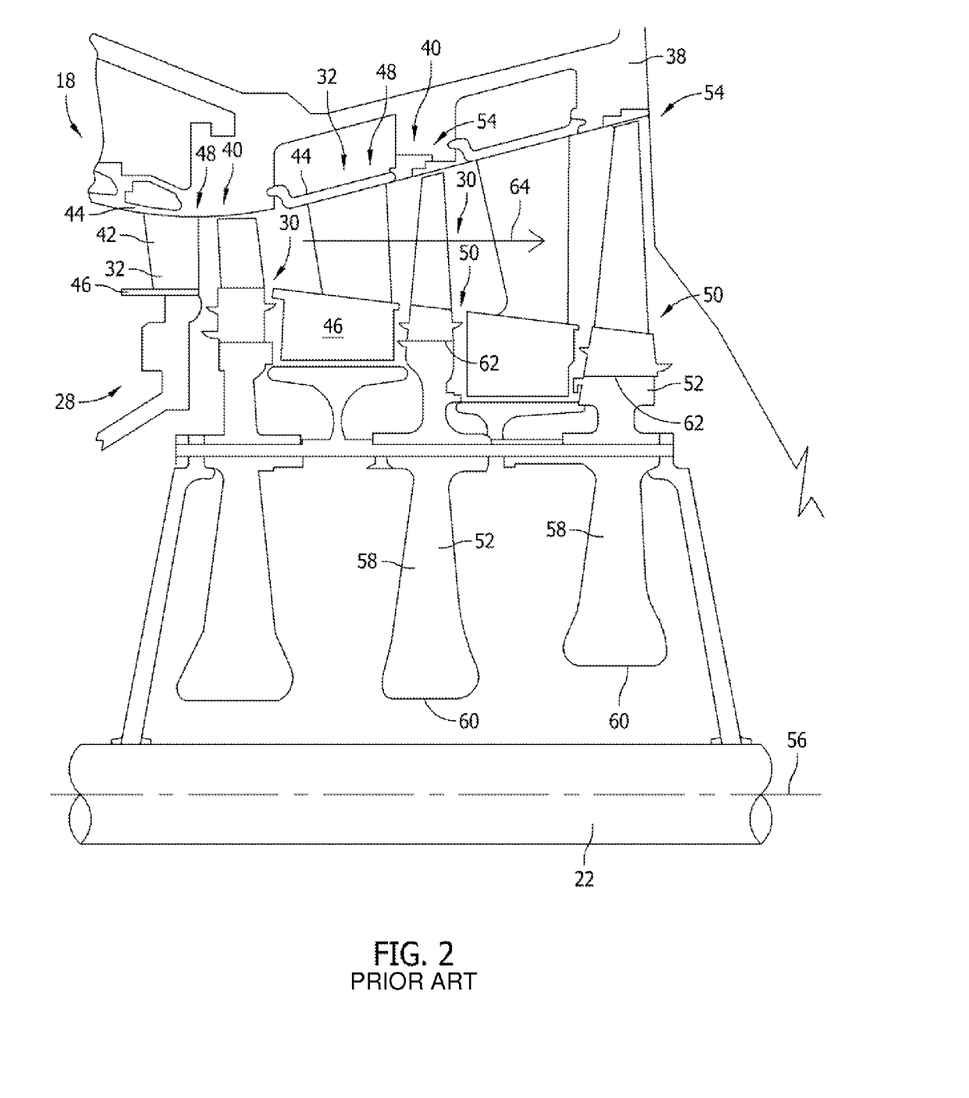
FIG. 2 is a partial sectional view of a portion of an exemplary turbine section that may be used with the turbine engine shown in FIG. 1.
Figure 3:
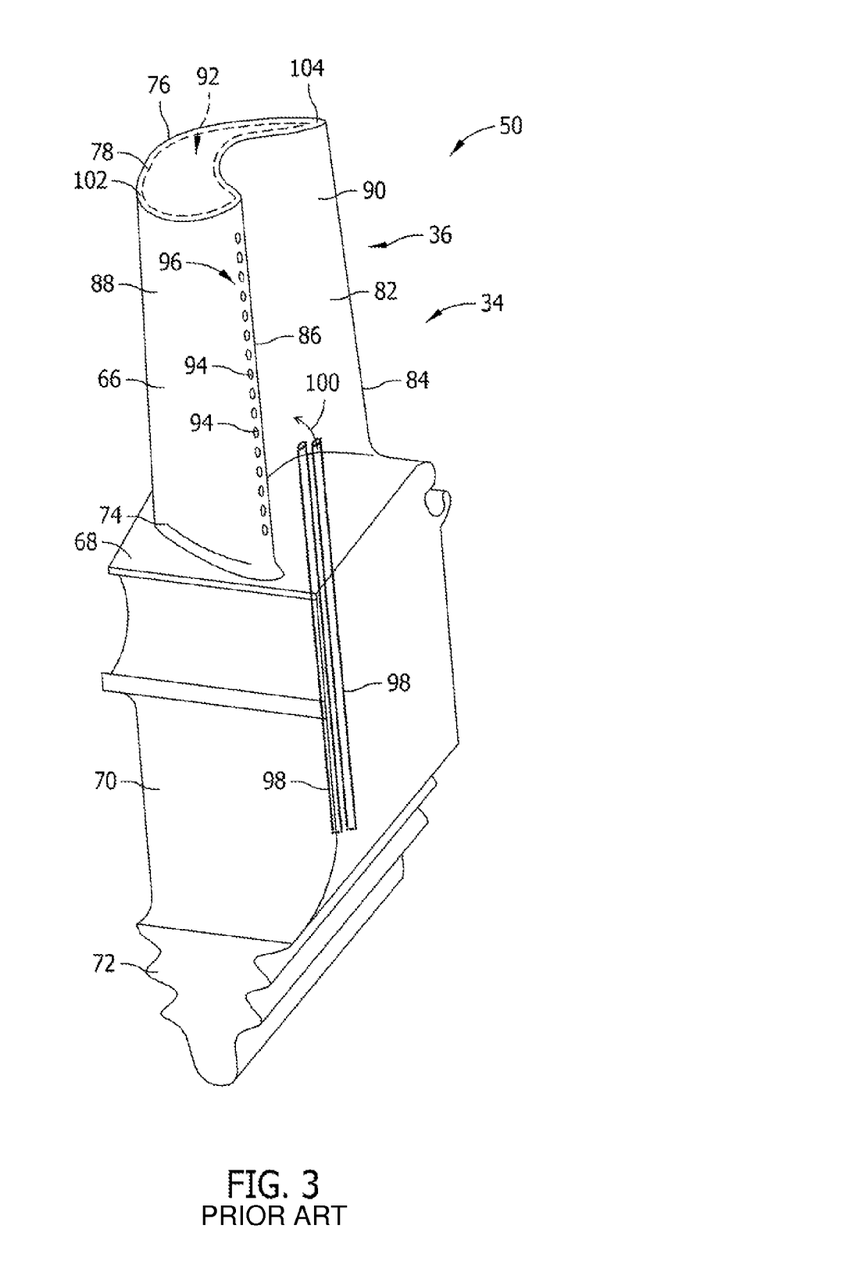
FIG. 3 is an enlarged perspective view of a portion of an exemplary turbine bucket assembly that may be used with the turbine engine shown in FIG. 1.
Figure 4:
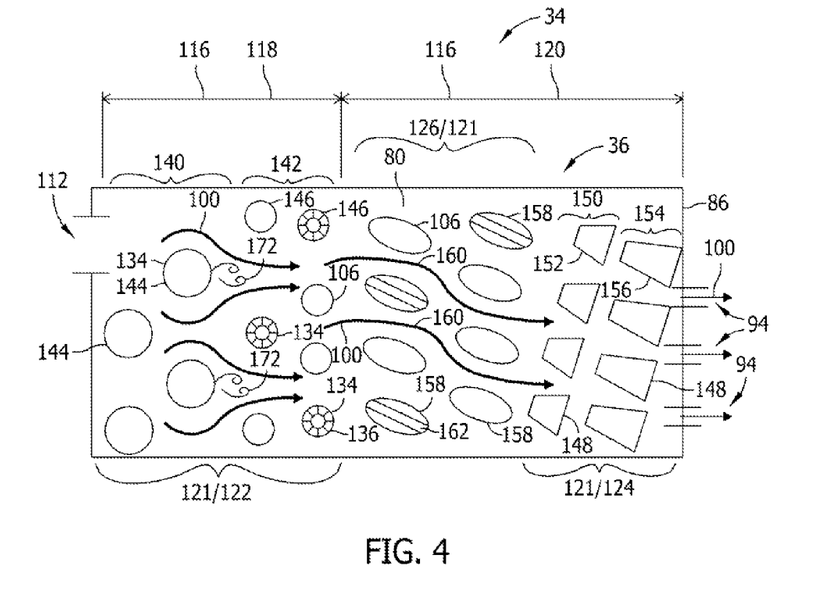
FIG. 4 is a partial top view of an exemplary cooling system that may be used with the turbine bucket shown in FIG. 3.
Figure 5:
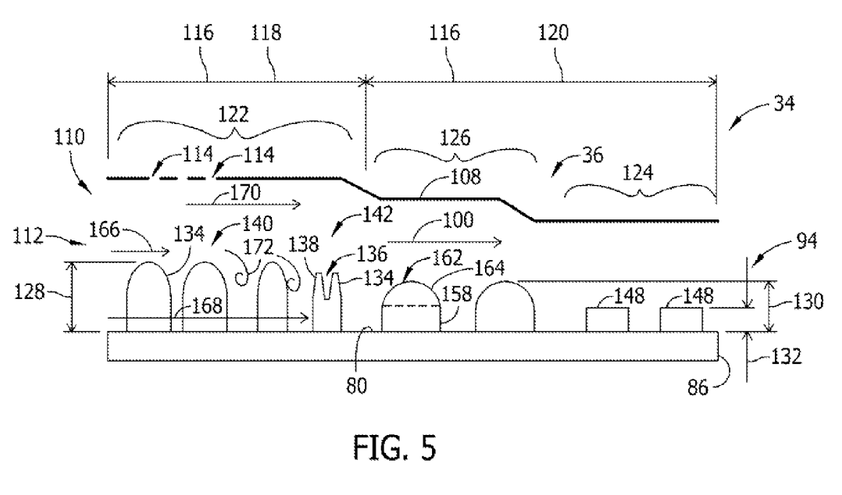
FIG. 5 is a partial side view of the cooling system shown in FIG. 4.

FIG. 2 is a partial sectional view of a portion of turbine section 18 including an exemplary rotor assembly 28. FIG. 3 is an enlarged perspective view of a portion of turbine bucket assembly 30. FIG. 4 is a partial top view of an exemplary cooling system 36 that may be used with turbine bucket assembly 30. FIG. 5 is a partial side view of cooling system 36. In the exemplary embodiment, turbine section 18 includes a turbine casing 38 and a plurality of stages 40 that are within turbine casing 38. Each stage 40 includes a stator vane assembly 32 and a turbine bucket assembly 30. Each stator vane assembly 32 includes a plurality of stator vanes, i.e. airfoils 42, that extend between an arcuate outer band 44 and an arcuate inner band 46, such that a stationary row 48 of stator vanes 42 extend between adjacent turbine bucket assemblies 30. Outer band 44 is coupled to casing 38. Inner band 46 is spaced radially inwardly from outer band 44.

Each turbine bucket assembly 30 includes a plurality of turbine buckets 50 that extend radially outwardly from a rotor disk 52 such that a row 54 of turbine buckets 50 is between adjacent stator vane assemblies 32. Each rotor disk 52 is coupled to rotor shaft 22 and rotates about a centerline axis 56 that is defined by rotor shaft 22. In the exemplary embodiment, each rotor disk 52 includes a disk body 58 that extends radially between a radially inner edge 60 and a radially outer edge 62. Each turbine bucket 50 is coupled to disk outer edge 62 and is spaced circumferentially about rotor disk 52. Stator vanes 42 are oriented to channel combustion gases downstream towards turbine buckets 50. A combustion gas path 64 is defined between turbine casing 38 and each rotor disk 52. Each row 48 and 54 of turbine buckets 50 and stator vanes 42 extends at least partially through a portion of combustion gas path 64.

In the exemplary embodiment, each turbine bucket 50 extends radially outwardly from disk body 58, and each includes an airfoil 66, a platform 68, a shank 70, and a dovetail 72. Airfoil 66 extends generally radially outwardly from platform 68. Platform 68 extends between airfoil 66 and shank 70 such that each airfoil 66 extends radially outwardly from platform 68 towards turbine casing 38. Shank 70 extends radially inwardly from platform 68 to dovetail 72. Dovetail 72 extends radially inwardly from shank 70 and enables turbine bucket 50 to be securely coupled to rotor disk 52. Airfoil 66 extends radially between a root end 74 positioned adjacent platform 68, and a tip end 76. Airfoil 66 extends radially outwardly from platform 68 towards turbine casing 38 such that tip end 76 is positioned adjacent turbine casing 38.

In the exemplary embodiment, airfoil 66 is substantially similar to stator vane airfoil 42, and each includes at least one sidewall 78 that includes an inner surface 80 and an outer surface 82. Outer surface 82 extends generally axially between a trailing edge 84 and a leading edge 86, and includes a suction side 88 and a pressure side 90. Each side 88 and 90 extends between leading edge 86 and trailing edge 84. In the exemplary embodiment, pressure side 90 is generally concave and suction side 88 is generally convex. Inner surface 80 extends between leading edge 86 and trailing edge 84 such that a cavity 92 is defined between leading edge 86 and trailing edge 84. At least one outlet opening 94 extends through sidewall 78 to couple cavity 92 in flow communication with combustion gas path 64. In one embodiment, outlet openings 94 are defined adjacent leading edge 86 and are oriented in a row 96 that extends between tip end 76 and root end 74. Alternatively, outlet openings 94 may be defined adjacent trailing edge 84, and/or be defined at any location between trailing edge 84 and leading edge 86. At least one cooling conduit 98 extends through platform 68 and is coupled in flow communication with cavity 92 for channeling cooling fluid 100 into cavity 92.

In the exemplary embodiment, airfoil 66 includes a first sidewall 102 that defines pressure side 90, and a second sidewall 104 that defines suction side 88. First sidewall 102 is coupled to second sidewall 104 along leading edge 86 and along trailing edge 84 such that cavity 92 is defined between first sidewall 102 and second sidewall 104. Cooling system 36 is coupled to first sidewall 102 and/or second sidewall 104 to facilitate regulating a temperature of airfoil 66. In one embodiment, cooling system 36 facilitates cooling airfoil 66 by transferring heat from airfoil 66 to cooling fluid 100. More specifically, cooling system 36 is coupled to inner surface 80 to channel cooling fluid 100 along inner surface 80 to facilitate convective cooling of airfoil 66. In the exemplary embodiment, cooling system 36 is configured to adjust a plurality of fluid flow characteristics of cooling fluid 100 such as, for example, a pressure, a velocity, a direction, a turbulence, and/or any other fluid flow characteristics that enable cooling system to function as described herein.

Cooling system 36 includes a plurality of projections 106 that extend from inner surface 80 and that are sized, shaped, and oriented to channel cooling fluid 100 from cooling conduits 98, across inner surface 80, and discharge cooling fluid 100 through outlet openings 94. In the exemplary embodiment, each projection 106 has a shape including one of a hemispherical, cylindrical, hemi-cylindrical, conic, triangular, rectangular, and/or trapezoidal. Alternatively, each projection 106 may have any suitable shape that enables cooling system 36 to function as described herein.

In one embodiment, airfoil 66 includes an impingement plate 108 that is coupled radially inwardly from inner surface 80 such that a cooling channel 110 is defined between impingement plate 108 and inner surface 80. Cooling channel 110 extends between an inlet opening 112, and outlet openings 94. In an alternative embodiment, impingement plate 108 may include a plurality of impingement openings 114 that extend through impingement plate 108 and that are oriented to discharge a jet of cooling fluid 100 from cavity 92 into cooling channel 110. In one embodiment, projections 106 may extend outwardly from inner surface 80 towards impingement plate 108. Alternatively, at least one projection 106 may be a dimple and/or a depression that extends inwardly from inner surface 80 and away from impingement plate 108.

In the exemplary embodiment, inner surface 80 includes a plurality of sections 116. Each section 116 operates with an operating temperature that is different than an adjacent section 116, such that a thermal gradient is formed across component 34 during operation. Moreover, inner surface 80 includes a first section 118 that includes a first operating temperature that is higher than an operating temperature of a second section 120. Cooling system 36 reduces a velocity of cooling fluid 100 and increases a fluid turbulence of cooling fluid 100 within first section 118 to facilitate increasing fluid retention time within first section 118 to facilitate increasing cooling within first section 118. In addition, cooling system 36 increases a fluid velocity within second section 120 to generate an aerodynamic exit fluid flow to facilitate reducing fluid retention time within second section 120. Moreover, cooling system 36 channels cooling fluid from first section 118 and across second section 120 such that cooling within first section 118 is greater than cooling within second section 120.

Cooling system 36, in the exemplary embodiment, includes a plurality of flow control assemblies 121 that are coupled to inner surface 80. Moreover, each flow control assembly 121 is configured to adjust one or more fluid flow characteristics of cooling fluid 100 to facilitate regulating a temperature of component 34. In the exemplary embodiment, cooling system 36 includes a first flow control assembly, i.e. a heat transfer assembly 122, a second flow control assembly, i.e. a flow regulator assembly 124, and a third flow control assembly, i.e. a flow diverter assembly 126. Heat transfer assembly 122 is configured to adjust a first fluid flow characteristic of cooling fluid 100, and flow regulator assembly 124 is configured to adjust a second fluid flow characteristic of cooling fluid 100 that is different than the first fluid flow characteristic. In addition, flow diverter assembly 126 is configured to adjust a third fluid flow characteristic that is different than the first fluid flow characteristic and/or the second fluid flow characteristic.

Each heat transfer assembly 122, flow regulator assembly 124, and flow diverter assembly 126 includes a plurality of projections 106 that extend outwardly from inner surface 80. In the exemplary embodiment, heat transfer assembly 122 extends a first distance 128 from inner surface 80. Flow regulator assembly 124 extends a second distance 130 from inner surface 80 that is less than first distance 128. Flow diverter assembly 126 extends outwardly a third distance 132 from inner surface 80 that is shorter than first distance 128, and that is larger than second distance 130. Alternatively, each first, second, and third distances 128, 130, and 132 may be approximately equal.

In the exemplary embodiment, second section 120 is defined between first section 118 and outlet openings 94. Heat transfer assembly 122 is oriented with respect to first section 118 to facilitate increasing cooling within first section 118. Heat transfer assembly 122 is sized, shaped, and oriented to induce a turbulence within cooling fluid 100 channeled across inner surface 80 to facilitate increasing heat transfer between cooling fluid 100 and sidewall 78. Flow regulator assembly 124 is oriented with respect to second section 120 and is between heat transfer assembly 122 and outlet openings 94. In one embodiment, flow regulator assembly 124 is oriented within heat transfer assembly 122. Alternatively, heat transfer assembly 122 may be oriented within flow regulator assembly 124. Flow regulator assembly 124 is sized, shaped, and oriented to adjust a fluid velocity and/or a fluid pressure of cooling fluid 100 channeled across inner surface 80 to generate an aerodynamic fluid flow. Moreover, flow regulator assembly 124 increases a fluid velocity of cooling fluid 100, and discharges cooling fluid 100 through outlet openings 94 to create an aerodynamic exit fluid flow. In the exemplary embodiment, flow diverter assembly 126 is oriented with respect to second section 120, and is between heat transfer assembly 122 and flow regulator assembly 124. In one embodiment, flow diverter assembly 126 is oriented within heat transfer assembly 122 and/or flow regulator assembly 124. Alternatively, heat transfer assembly 122 may be oriented within flow diverter assembly 126, or flow regulator assembly 124 may be oriented within flow diverter assembly 126. Flow diverter assembly 126 is sized, shaped, and oriented to adjust a direction of cooling fluid 100 channeled from heat transfer assembly 122 to flow regulator assembly 124.

Heat transfer assembly 122 includes a plurality of heat transfer projections 134 that are coupled to inner surface 80 and that are positioned with respect to first section 118 of inner surface 80. Each heat transfer projection 134 extends outwardly from inner surface 80 and has a size, shape, and orientation that facilitates increasing fluid turbulence within heat transfer assembly 122. In one embodiment, at least one heat transfer projection 134 includes one or more slots 136 that extend through a top portion 138 of heat transfer projection 134 for adjusting a direction of cooling fluid 100 that is channeled through heat transfer assembly 122. In the exemplary embodiment, heat transfer assembly 122 includes a first set 140 of heat transfer projections 134, and at least a second set 142 of heat transfer projections 134. First set 140 increases fluid turbulence within cooling fluid 100, and second set 142 channels cooling fluid 100 through heat transfer assembly 122. In one embodiment, first and second sets 140 and 142 each include heat transfer projections 134 that have a substantially similar shape. Alternatively, first set 140 may include a plurality of heat transfer projections 134 that have a first shape 144, and second set 142 may include a plurality of heat transfer projections 134 that have a second shape 146 that is different than the first shape 144.

In addition, flow regulator assembly 124 includes a plurality of flow regulator projections 148 that are coupled to inner surface 80, and are sized, shaped, and oriented to facilitate adjusting fluid velocity of cooling fluid 100 channeled across inner surface 80. Each flow regulator projection 148 extends outwardly from inner surface 80, and discharges cooling fluid 100 from heat transfer assembly 122 through outlet openings 94. In one embodiment, each flow regulator projection 148 has a substantially similar shape. Alternatively, flow regulator assembly 124 may include a first group 150 of flow regulator projections 148 that have a first shape 152, and include a second group 154 of flow regulator projections 148 that have a second shape 156 that is different than a first shape 152.

Similarly, flow diverter assembly 126 includes a plurality of flow diverter projections 158 that are coupled to inner surface 80 and extend outwardly from inner surface 80. Each flow diverter projection 158 adjusts a direction of cooling fluid 100 being channeled across inner surface 80. Moreover, each flow diverter projection 158 is oriented with respect to an adjacent flow diverter projection 158 to channel cooling fluid 100 along a predefined fluid path 160. In one embodiment, at least one flow diverter projection 158 includes a slot 162 that extends through a top portion 164 of flow diverter projection 158. Slot 162 is sized to facilitate channeling cooling fluid 100 along a fluid path 160.

During operation, as cooling fluid 100 is channeled across inner surface 80, a cooling layer 166 is formed within cooling fluid 100 that includes a surface region 168 at or near inner surface 80, and a free stream region 170 defined outwardly with respect to inner surface 80 from surface region 168. Free stream region 170 has a momentum that is greater than a momentum of surface region 168. As cooling fluid 100 is channeled across inner surface 80, an increase in pressure gradients between surface region 168 and free stream region 170 may induce separation of cooling layer 166 from inner surface 80. As cooling layer 166 separates from inner surface 80, an amount of heat transferred between airfoil 66 and cooling fluid 100 is reduced.

In the exemplary embodiment, heat transfer projections 134 are configured to facilitate the formation of vortices 172 downstream of one or more heat transfer projections 134 to impart a swirl upon cooling fluid 100, and to channel a flow of cooling fluid 100 from free stream region 170 towards surface region 168. Vortices 172 transfer momentum from free stream region 170 to surface region 168 to facilitate increasing momentum of cooling layer 166 and to facilitate an attached flow within cooling layer 166 to increase convective cooling of component 34. In addition, heat transfer assembly 122 channels heated cooling fluid 100 to flow diverter assembly 126.

Flow diverter projection 158 channels the heated cooling fluid 100 from heat transfer assembly 122, along a fluid path 160, and to flow regulator assembly 124. In one embodiment, flow diverter projection 158 reduces a pressure differential across flow diverter projection 158 to facilitate channeling cooling fluid 100 from heat transfer assembly 122 to flow regulator assembly 124. In the exemplary embodiment, flow regulator projections 148 channel cooling fluid 100 from flow diverter assembly 126 towards outlet opening 94, and facilitate increasing fluid velocity of cooling fluid 100 being channeled across inner surface 80. In the exemplary embodiment, flow regulator projections 148 reduce a fluid pressure of cooling fluid 100 flowing across inner surface 80 and discharge cooling fluid 100 through outlet openings 94.

Figure 6:
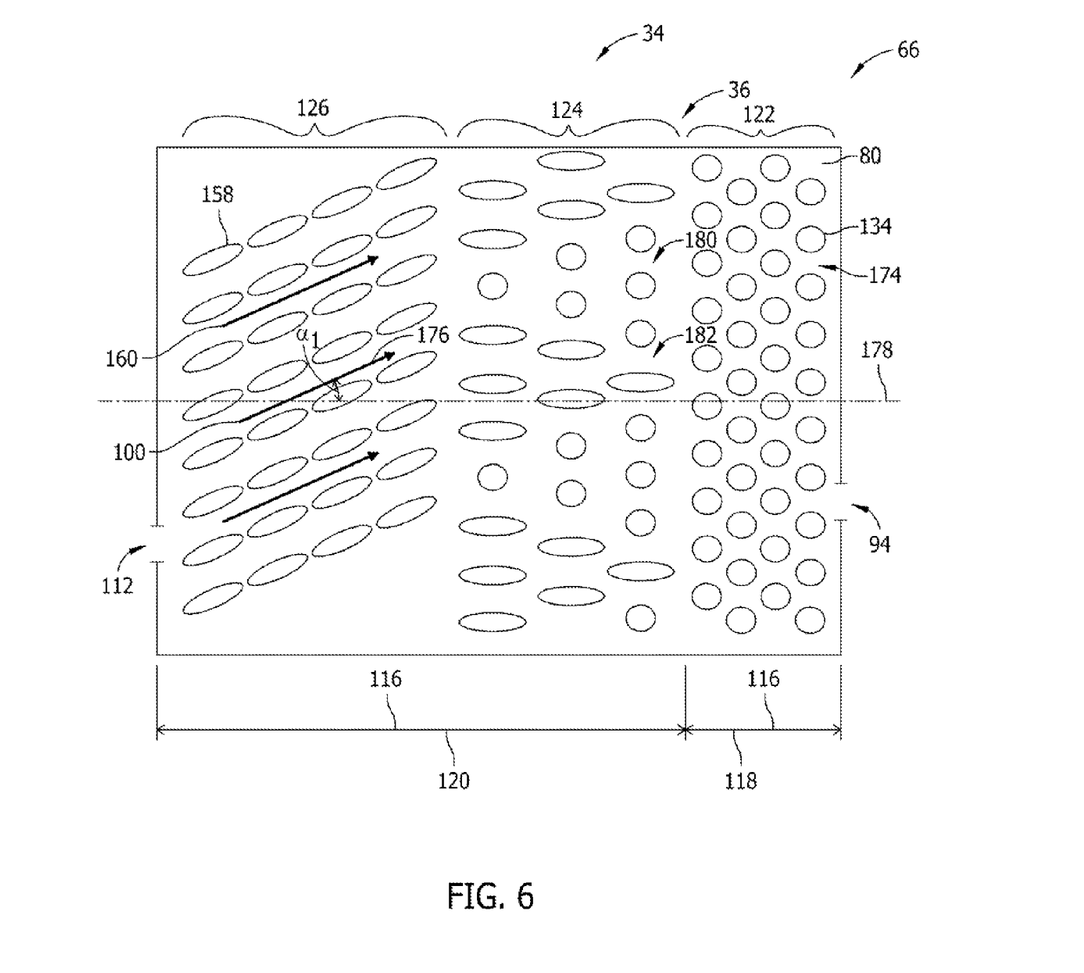
FIG. 6 is a partial top view of an alternative embodiment of the cooling system shown in FIG. 4.

FIG. 6 is a partial top view of an alternative embodiment of cooling system 36. Identical components shown in FIG. 6 are identified using the same reference numbers used in FIGS. 3-5. In an alternative embodiment, first section 118 of airfoil 66 is defined near outlet openings 94, such that increased cooling is desired near outlet openings 94. In this embodiment, heat transfer assembly 122 is oriented adjacent outlet openings 94, and oriented with respect to first section 118 to increase cooling within first section 118. Heat transfer assembly 122 includes a plurality of heat transfer projections 134 that are oriented in an array 174 and that have a substantially similar shape. Flow diverter assembly 126 is oriented near inlet opening 112, and extends towards heat transfer assembly 122. Each flow diverter projection 158 includes a substantially similar shape, and is oriented to channel cooling fluid 100 along a fluid path 176 that is oriented at an oblique angle $\alpha_1$ with respect to a longitudinal axis 178 that extends between inlet opening 112 and outlet opening 94. Flow regulator assembly 124 is positioned between flow diverter assembly 126 and heat transfer assembly 122. Flow regulator assembly 124 includes a plurality of first projection groups 180 and a plurality of second projection groups 182 that are between each first projection group 180.

In the exemplary embodiment, flow diverter assembly 126 channels cooling fluid 100 along a fluid path 160 from inlet opening 112 towards flow regulator assembly 124. Flow regulator assembly 124 reduces fluid velocity of cooling fluid 100 and channels cooling fluid 100 to heat transfer assembly 122. Heat transfer assembly 122 induces a formation of vortices 172 within cooling fluid 100 to further reduce fluid velocity of cooling fluid 100 and increase cooling of sidewall 78. Heat transfer assembly 122 discharges the heated cooling fluid through outlet openings 94.

Figure 7:
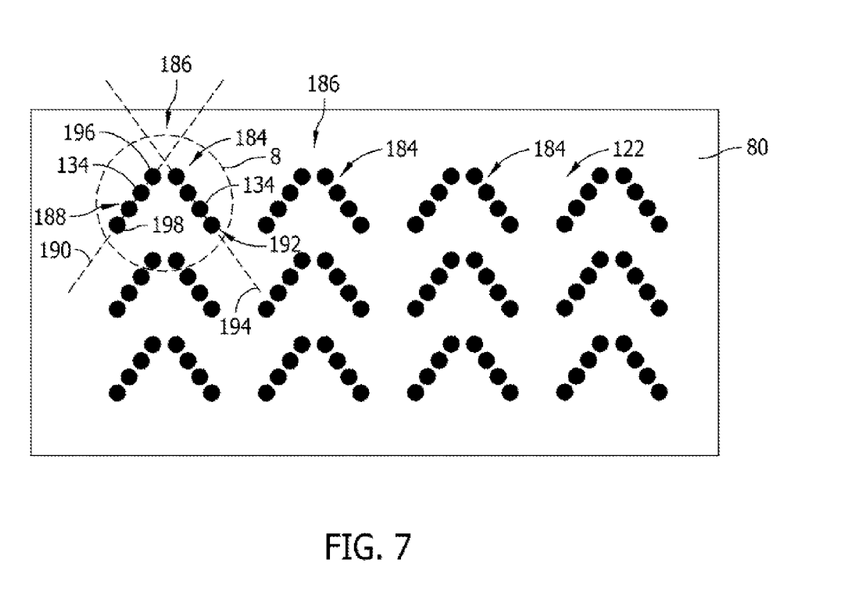
FIG. 7 is a partial top view of an exemplary heat transfer assembly that may be used with the cooling system shown in FIG. 4.
Figure 8:
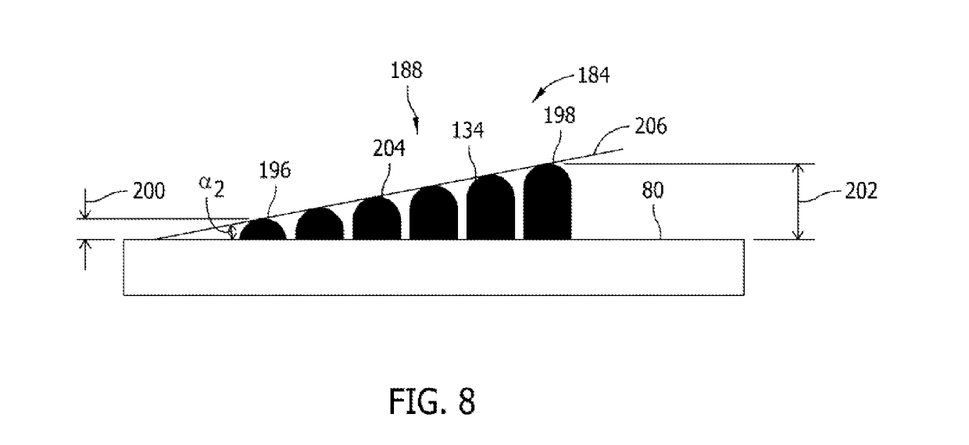
FIG. 8 is a partial side view of the heat transfer assembly shown in FIG. 6 and taken along area 8.

FIG. 7 is a partial top view of a portion of heat transfer assembly 122. FIG. 8 is a partial side view of heat transfer assembly 122, and taken along area 8. Identical components shown in FIGS. 7 and 8 are identified using the same reference numbers used in FIGS. 3-5. In the exemplary embodiment, heat transfer assembly 122 includes a plurality of heat transfer members 184. Each heat transfer member 184 includes a plurality of heat transfer projections 134 that are oriented with respect to an adjacent heat transfer projection 134 such that heat transfer member 184 includes a substantially chevron shape 186. Moreover, heat transfer assembly 122 includes at least a first plurality of heat transfer projections 134, wherein the first plurality of heat transfer projections 134 are arranged as an ensemble that has a chevron shape. In addition, heat transfer member 184 includes a first collection 188 of heat transfer projections 134 that are oriented with respect to a first axis 190, and a second collection 192 of heat transfer projections 134 that are oriented with respect to a second axis 194 that intersects first axis 190.

In the exemplary embodiment, first and second collections 188 and 192 each extend between a first projection, i.e. a forward projection 196 and a second projection, i.e. an aft projection 198. Forward projection 196 extends a first distance 200 from inner surface 80, and aft projection 198 extends a second distance 202 from inner surface 80 that is larger than first distance 200. Moreover, each heat transfer projection 134 that is between forward and aft projections 196 and 198, respectively, extends a stepwise distance from inner surface 80 such that each top portion 204 of each heat transfer projection 134 defines a plane 206 that is oriented at an oblique angle $\alpha_2$ with respect to inner surface 80.

The size, shape, and orientation of cooling system 36 is variably selected to facilitate increasing cooling within a turbine component 34 that has a section having a higher operating temperature than an adjacent section. Moreover, the size, shape, and orientation of heat transfer assembly 122 is selected to induce turbulence within cooling fluid 100 to facilitate increasing heat transfer between cooling fluid 100 and component 34. In addition, flow regulator assembly 124 is sized, shaped, and configured to adjust a flow velocity of cooling fluid 100 and to cause cooling fluid 100 to be channeled from heat transfer assembly 122 to an outlet opening 94 of component 34. By providing a cooling system that includes a heat transfer assembly and a flow control assembly, cooling fluid may be channeled to sections of the component that require additional cooling, which reduces the formation of undesired temperature variations within the component.

The above-described cooling system overcomes at least some disadvantages of known cooling systems by providing a heat transfer assembly that facilitates increasing cooling of a component, and a flow control assembly that facilitates channeling the cooling fluid from the heat transfer assembly. The cooling system also provides increase cooling and generates an aerodynamic exit flow across the component. By providing a heat transfer assembly and a flow control assembly, the formation of an undesired temperature variation within the component is facilitated to be reduced, which increases the operating life of the turbine engine component. As such, the cost of maintaining the component can be reduced.

Exemplary embodiments of methods and systems for use in regulating a temperature of components are described above in detail. The systems, methods, and apparatus are not limited to the specific embodiments described herein, but rather, components of systems and/or steps of the method may be utilized independently and separately from other components and/or steps described herein. For example, the systems, methods, and apparatus may also be used in combination with other combustion systems and methods, and are not limited to practice with only the gas turbine engine assembly as described herein. Moreover, the cooling system described herein may be used, for example, in any high-fluid flow environment (e.g., gas or liquid) in which efficient heat exchange and aerodynamic or hydrodynamic exit flow, as the case may be, is desired. Thus, the exemplary embodiment can potentially be implemented and utilized in connection with many other component cooling system applications other than gas turbines.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cooling system for use in regulating a temperature of a component, said cooling system comprising:
a plurality of flow control assemblies defined across a sidewall of the component for channeling cooling fluid across a surface of the sidewall, said plurality of flow control assemblies configured to adjust a plurality of fluid flow characteristics of a cooling fluid, said plurality of flow control assemblies comprising:
a first flow control assembly comprising a plurality of first projections configured to adjust a first fluid flow characteristic;
a second flow control assembly comprising a plurality of second projections configured to adjust a second fluid flow characteristic that is different than the first fluid flow characteristic; and
a third flow control assembly positioned between said first and second flow control assemblies, said third flow control assembly comprising a combination of said first and second projections.

2. The cooling system in accordance with claim 1, wherein said first flow control assembly comprises a heat transfer assembly, said heat transfer assembly being configured to induce turbulence within the cooling fluid channeled across the sidewall to facilitate increased heat transfer between the cooling fluid and the component.

3. The cooling system in accordance with claim 2, wherein said plurality of first projections are arranged as an ensemble having a chevron shape.

4. The cooling system in accordance with claim 3, wherein said heat transfer assembly comprises the first projection extending a first height from the sidewall, and at least a second projection extending a second height from the sidewall that is different from the first height.

5. The cooling system in accordance with claim 2, wherein said third flow control assembly comprises a flow regulator assembly, said flow regulator assembly being configured to adjust a flow velocity of the cooling fluid channeled across the sidewall.

6. The cooling system in accordance with claim 5, wherein said second flow control assembly comprises a flow diverter assembly, said flow diverter assembly being configured to adjust a direction of the cooling fluid channeled across the sidewall.

7. The cooling system in accordance with claim 6, wherein said pluralities of first and second projections extend from said sidewall.

8. The cooling system in accordance with claim 6, wherein said flow regulator assembly is oriented between said heat transfer assembly and said flow diverter assembly for channeling cooling fluid from said heat transfer assembly to said flow diverter assembly.

9. An airfoil for use in a turbine engine, said airfoil comprising:
- a sidewall comprising an inner surface that defines a cavity therein; and
- a cooling system defined across said inner surface for channeling a cooling fluid across said inner surface to facilitate regulating a temperature of said airfoil, said cooling system comprising:
  - a plurality of flow control assemblies configured to adjust a plurality of fluid flow characteristics of the cooling fluid, said plurality of flow control assemblies comprising:
    - a first flow control assembly comprising a plurality of first projections configured to adjust a first fluid flow characteristic;
    - a second flow control assembly comprising a plurality of second projections configured to adjust a second fluid flow characteristic that is different than the first fluid flow characteristic; and
    - a third flow control assembly positioned between said first and second flow control assemblies, said third flow control assembly comprising a combination of said first and second projections.

10. The airfoil in accordance with claim 9, wherein said first flow control assembly comprises a heat transfer assembly, said heat transfer assembly being configured to induce turbulence within the cooling fluid channeled across said inner surface to facilitate increased heat transfer between the cooling fluid and said sidewall.

11. The airfoil in accordance with claim 10, wherein said plurality of first projections are arranged as an ensemble having a chevron shape.

12. The airfoil in accordance with claim 11, wherein said heat transfer assembly comprises the first projection extending a first height from said sidewall, and at least a second projection extending a second height from said sidewall that is different from the first height.

13. The airfoil in accordance with claim 10, wherein said third flow control assembly comprises a flow regulator assembly, said flow regulator assembly being configured to control a flow velocity of the cooling fluid channeled across said inner surface.

14. The airfoil in accordance with claim 13, wherein said second flow control assembly comprises a flow diverter assembly extending from said inner surface, said flow diverter assembly being configured to adjust a direction of the cooling fluid channeled across said inner surface.

15. The airfoil in accordance with claim 14, wherein said pluralities of first and second projections extend from said sidewall.

16. The airfoil in accordance with claim 14, wherein said flow diverter assembly is oriented between said heat transfer assembly and said flow regulator assembly for channeling the cooling fluid from said heat transfer assembly to said flow regulator assembly.

17. A method of assembling an airfoil for use in a turbine engine, said method comprising:
- providing a first flow control assembly including a plurality of first projections on a first sidewall of the airfoil, wherein the first flow control assembly is configured to adjust a first flow characteristic of a cooling fluid channeled across the first sidewall to facilitate regulating a temperature of the airfoil;
- providing a second flow control assembly including a plurality of second projections on the first sidewall, wherein the second flow control assembly is configured to adjust a second flow characteristic of the cooling fluid that is different than the first fluid flow characteristic;
- providing a third flow control assembly on the first sidewall between the first and second flow control assemblies, wherein the third flow control assembly includes a combination of the first and second projections; and
- coupling a second sidewall to the first sidewall to form the airfoil extending between a leading edge and a trailing edge, and having a cavity that is at least partially defined by the first sidewall inner surface.

18. The method in accordance with claim 17, wherein the first flow control assembly includes a heat transfer assembly, said method further comprising orienting the heat transfer assembly to induce turbulence within the cooling fluid channeled across an inner surface of the first sidewall.

19. The method in accordance with claim 17, wherein the third flow control assembly includes a flow regulator assembly, said method further comprising orienting the flow regulator assembly to adjust a velocity of the cooling fluid being channeled across the inner surface.

20. The method in accordance with claim 17, wherein the second flow control assembly includes a flow diverter assembly, said method further comprising providing the flow diverter assembly on the first sidewall inner surface such that the flow diverter assembly extends from the inner surface, wherein the flow diverter assembly is configured to adjust a direction of the cooling fluid being channeled across the inner surface.

* * * * *